United States Patent [19]
Lautzenhiser et al.

[11] Patent Number: 4,457,168
[45] Date of Patent: Jul. 3, 1984

[54] AUTOMATED BOREHOLE GRAVITY METER SYSTEM

[75] Inventors: Theodore V. Lautzenhiser; Jimmy D. Wirtz, both of Tulsa, Okla.

[73] Assignee: Standard Oil Company, Chicago, Ill.

[21] Appl. No.: 474,064

[22] Filed: Mar. 10, 1983

[51] Int. Cl.³ .......................... G01V 7/04; G01N 29/04
[52] U.S. Cl. ...................................................... 73/151
[58] Field of Search .................. 73/382 R, 382 G, 151; 364/422

[56] References Cited

U.S. PATENT DOCUMENTS 3,798,966  3/1974  Planche ................................. 73/151
4,399,693  8/1983  Gournay ........................... 73/382 R

OTHER PUBLICATIONS

Block and Moore, "Measurements in the Earth Mode Frequency Range by an Electrostatic Sensing and Feedback Gravimeter" Journal of Geophysical Research, vol. 71, No. 18, 9/15/66, pp. 4361-4375.

Moore and Farrell, "Linerazation and Calibration of Electrostatically Feedback Gravity Meters", Journal of Geophysical Research, vol. 75, No. 5, 2/10/79, pp. 928-932.

Primary Examiner—Donald O. Woodiel
Assistant Examiner—Ellwood G. Harding, Jr.
Attorney, Agent, or Firm—Scott H. Brown; Timothy D. Stanley

[57] ABSTRACT

An automated borehole gravity meter system for measuring gravity within a wellbore. The gravity meter includes leveling devices for leveling the borehole gravity meter, displacement devices for applying forces to a gravity sensing device within the gravity meter to bring the gravity sensing device to a predetermined or null position. Electronic sensing and control devices are provided for (i) activating the displacement devices, (ii) sensing the forces applied to the gravity sensing device, (iii) electronically converting the values of the forces into a representation of the gravity at the location in the wellbore, and (iv) outputting such representation. The system further includes electronic control devices with the capability of correcting the representation of gravity for tidal effects, as well as, calculating and outputting the formation bulk density and/or porosity.

14 Claims, 15 Drawing Figures

AUTOMATED BOREHOLE GRAVITY METER SYSTEM

BACKGROUND OF THE INVENTION

1. Field of the Invention

The present invention relates to a borehole gravity meter system and, more particularly, to such a system which includes electronic control circuitry to, upon initiation, balance or null a gravity sensing device within the gravity meter and thereafter calculate and display a representation of the gravity at a selected depth within the borehole.

2. Background of the Invention

The use of gravity meters to measure the gravity at a location within a wellbore is well known in the art. One type of borehole gravity meter is known as a LaCoste and Romberg gravity meter which will be described in more detail below. Basically, a gravity meter of the LaCoste and Romberg configuration includes a gravity sensing device which is balanced or "nulled" and the adjustments made to null the device are interpreted to provide an indication of the gravity at a position in the wellbore.

The gravity sensing device generally comprises a hinged horizontal beam with a mass connected to one end thereof. The beam is unclamped to allow for its free movement after the gravity meter has been stopped within the borehole. A spring is connected at one end to the beam and at an opposite end to a stationary point in the gravity meter. The spring applies an upward force to the beam and mass and the tension of the spring and thus the position of the beam and mass can be adjusted by the operation of a motorized measuring screw. The mass is free to move between two parallel horizontal plates which are part of a capacitive position indicator (CPI) circuit. The position of the mass is detected by this CPI circuit and its output is sent to a chart recorder on the surface. The operator views the chart recorder and causes the measuring screw to move to adjust the spring tension until the mass is in balance between the downward force of gravity on the beam and mass and the upward force of the spring. This is called nulling the meter, i.e., there is no motion in the beam and mass when a balance has been achieved and the mass is approximately equal distance between the two CPI plates. Once a null has been obtained, a gravity reading can be determined by taking the amount of movement of the measuring screw to achieve the null and performing several simple calculations. The beam is then clamped and the gravity meter can be moved to the next location where the procedure is repeated. This method of obtaining a gravity measurement is laborious and fatiguing to the operator because of the attention and skill needed to watch the chart recorder and adjust the spring tension to achieve a null.

Certain borehole gravity meter systems use a microprocessor to continuously level the gravity meter. However, because of factors such as noise and mechanical hysteresis, the nulling and reading of the measuring screw position still has to be done manually in this type of gravity meter. The result of mechanical hysteresis is that a null achieved with the measuring screw rotated in one direction will be different from a null achieved with the measuring screw rotated in the opposite direction. Therefore, the operator needs to be careful in rotating the measuring screw in only one direction to achieve a null. Noise, such as hole noise, earthquakes or small tool movement, has to be filtered out or disregarded as to its cyclic content before any corrections to the measuring screw position can be made or an overshoot of the correct reading will occur, i.e., the operator must judge the cyclic motion of the beam on the chart recorder caused by the noise before making a correction to the measuring screw position. This ability to evaluate the cyclic motion requires capabilities of pattern recognition which if done electronically, presently requires large and powerful computing systems.

To overcome some of these problems, electrostatic forces can be applied to the mass to move it to a desired position, as illustrated in "Measurements in the Earth Mode Frequency Range by an Electrostatic Sensing Gravimeter" by Barry Block and R. D. Moore, Journal of Geophysics, Research (1971) 18, 4361-4375 (1966), which is incorporated by reference. In the system of Block and Moore, the measuring screw is rotated to move the mass to a null position while a voltage is applied to the CPI plates. The movement of the mass between the plates causes changes in the voltage readings which are monitored to determine the mass position. The mass' range of movement caused by the electrostatic forcing of the CPI plates can be equivalent to several milligals so the measuring screw is seldom used in systems as described in the Block and Moore paper (supra); however, in the borehole, the gravity to be measured during a survey varies over a range on the order of several hundred milligals and as such, the measuring screw will be used regularly.

A significant problem with the operation of all of these gravity meters is the attentiveness and skill required of the operator to read the chart recorder and adjust the measuring screw position to null the position. If a reading is taken when the meter is not leveled or nulled, obviously the gravity measurement will be inaccurate. In the field, the quality of the operators varies so the quality of the gravity measurements can vary. These types of gravity measurements are time consuming and an operator can attempt to obtain an accurate gravity measurement by watching a chart recorder after having been on the job for over 24 hours straight. After a null has been achieved, the position of the measuring screw is taken and the operator transcribes the measuring screw position data into a written log and also perform some hand calculations to obtain a gravity measurement. This need for operator transcription can also be a source of errors in the gravity surveys.

The inventors hereof know of no borehole gravity meter system which nulls the meter upon operator initiation and internally calculates the gravity reading without the need for human reading and transcription.

SUMMARY OF THE INVENTION

The present invention is for an automated borehole gravity meter system designed to overcome the foregoing disadvantages. The automated borehole gravity meter system of the present invention includes a gravity sensing device for measuring the gravity at a location in a wellbore which penetrates a subterranean formation. Devices are included for sensing the position of the gravity sensing device and for applying forces to adjust the position of the gravity sensing device. Electronic control devices are included for taking an indication of the position of the gravity sensing device and activating the device to apply forces to move the gravity sensing device to a predetermined position. An output device is included for outputting a representation of the forces applied to the gravity sensing device. Devices can be included for converting the representation of the forces to a representation of the gravity at the location in the wellbore.

The gravity meter system of the present invention further can include a microprocessor for activating the leveling of the gravity sensing device, the unclamping of the gravity sensing device, the position adjustment of the gravity sensing device, and the electronic devices to sense the applied forces and convert the values of the forces into a representation of the gravity at the location of the wellbore. This representation of the gravity can be outputted to a CRT, stored in memory or printed in hardcopy form.

The borehole gravity meter system further can include a microprocessor with the capabilities of correcting the representation of the gravity for the tide effects, as well as calculating and outputting the formation bulk density and/or the porosity of the formation.

The present invention overcomes the disadvantages of the systems described above by having the capability to, upon activation, adjust the position of the gravity sensing device to a predetermined position, such as the null position, which greatly reduces the time and potential for errors associated with the operator having to do the same procedures manually. Also, the present invention can calculate internally the gravity measurement thereby reducing the errors associated with operator having to calculate the gravity. The present invention further can include the capability of, upon activation, leveling, nulling and calculating the gravity measurement which thereby allows the operator to concentrate on other areas of work, produces a highly accurate and reproducible gravity measurement which is not as dependent upon the quality or alertness of the operator.

DETAILED DESCRIPTION OF THE PREFERRED EMBODIMENTS

The present invention generally comprises an automated borehole gravity meter system and the methods of use thereof. The gravity meter system of the present invention is a borehole gravity meter which has leveling devices connected thereto to level a gravity sensing device within the gravity meter. Sensing and displacement devices are provided to sense the position of the gravity sensing device and apply forces thereto to move the gravity sensing device to a null position. Calculation devices can be provided to electronically convert the values of these forces into a representation of the gravity at that location in the wellbore. This representation of gravity is then outputted to the operator.

As used herein, the term "null" shall mean the process of where a gravity sensing device comprising a beam hingably connected at one end to a stationary point within the gravity meter is brought into balance between the downward force of gravity acting on the beam and the upward force of an adjustable-tension spring, connected at one end to the beam and at another end to a stationary point in the gravity meter. Further, as used herein, the term "automatic" or "automatically" shall mean an electronic machine implemented control sequence which, upon activation by the operator, will perform the desired function(s).

Figure 1:
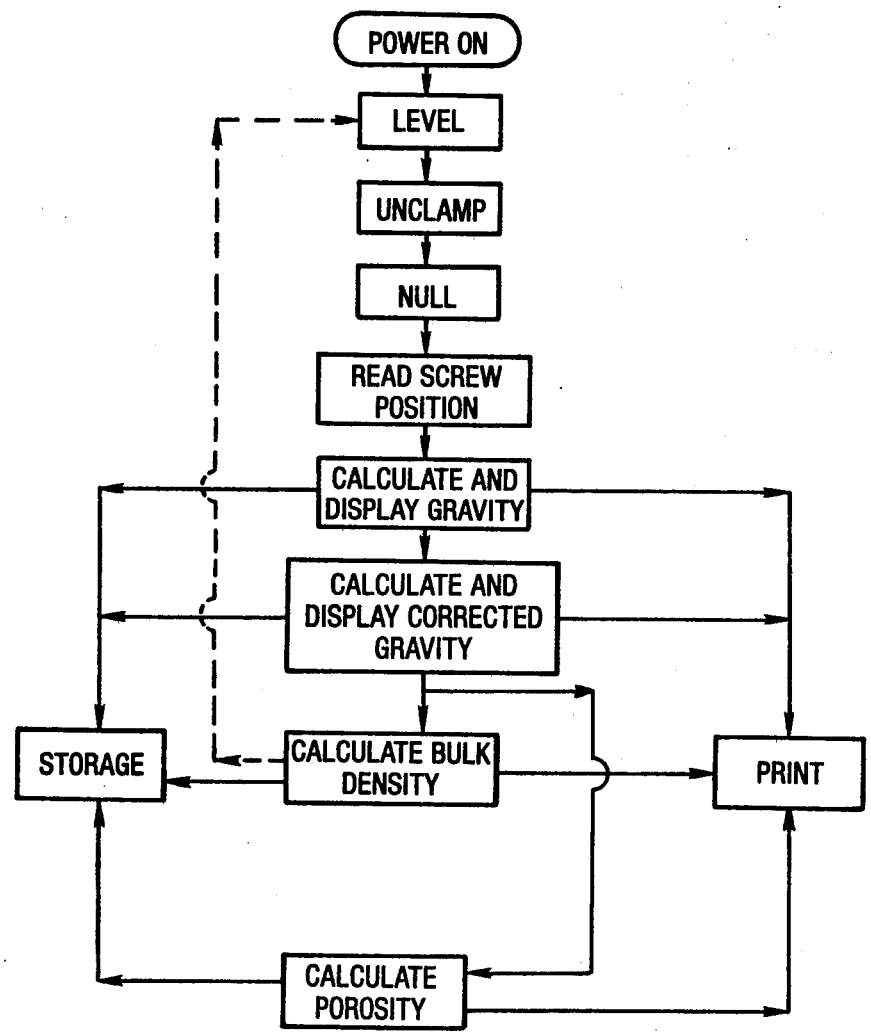
FIG. 1 is a block diagram of the sequence of operation of the present invention.

To aid the reader in understanding the operation and novelty of the present invention, reference is made to FIG. 1 which diagrammatically shows the sequence of operation of the borehole gravity meter system. After the gravity meter has been encapsulated within a steel casing or sonde and has been connected to a well service wireline or the like, the meter is lowered into the wellbore. Once the gravity meter has been stopped and stabilized adjacent the formation where a gravity measurement is to be made, the operator activates the leveling devices to level the gravity meter within the borehole and which run continuously to maintain the gravity meter in a level position at all times.

Next, an unclamping system is activated to free the gravity sensing device within the gravity meter. Displacement devices then are activated to apply vertical forces, such as a combination of mechanical forces and electrostatic forces, which will be described in more detail herein below, to the gravity sensing device to move the gravity sensing device to a null position. Thereafter, electronic devices automatically sense or read the amount of forces applied to the gravity sensing device to bring it to a null position and calculate a representation of the gravity at that depth in the wellbore. The representation is outputted for visual display, printing or memory storage.

The operator can have the representation of gravity corrected for the scale factor of that particular gravity meter, which will be described in more detail hereinbelow, and additional data can be inputted into the system to calculate the (a) the gravity measurement corrected for the tidal affects, (b) bulk density of the formation, and (c) the porosity of the formation.

Figure 2:
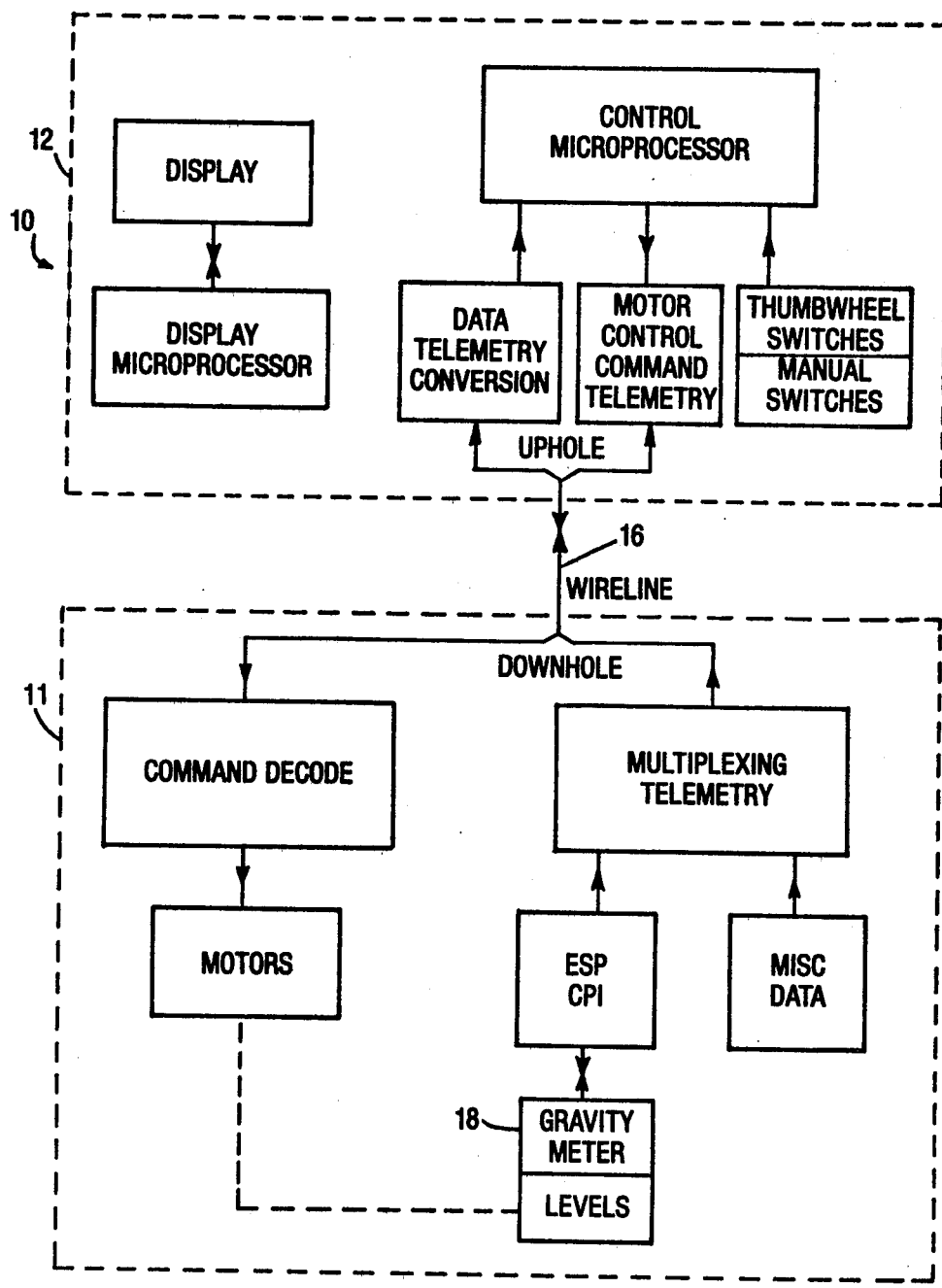
FIG. 2 is a block diagram of the surface and downhole electronics used in the present invention.
Figure 3:
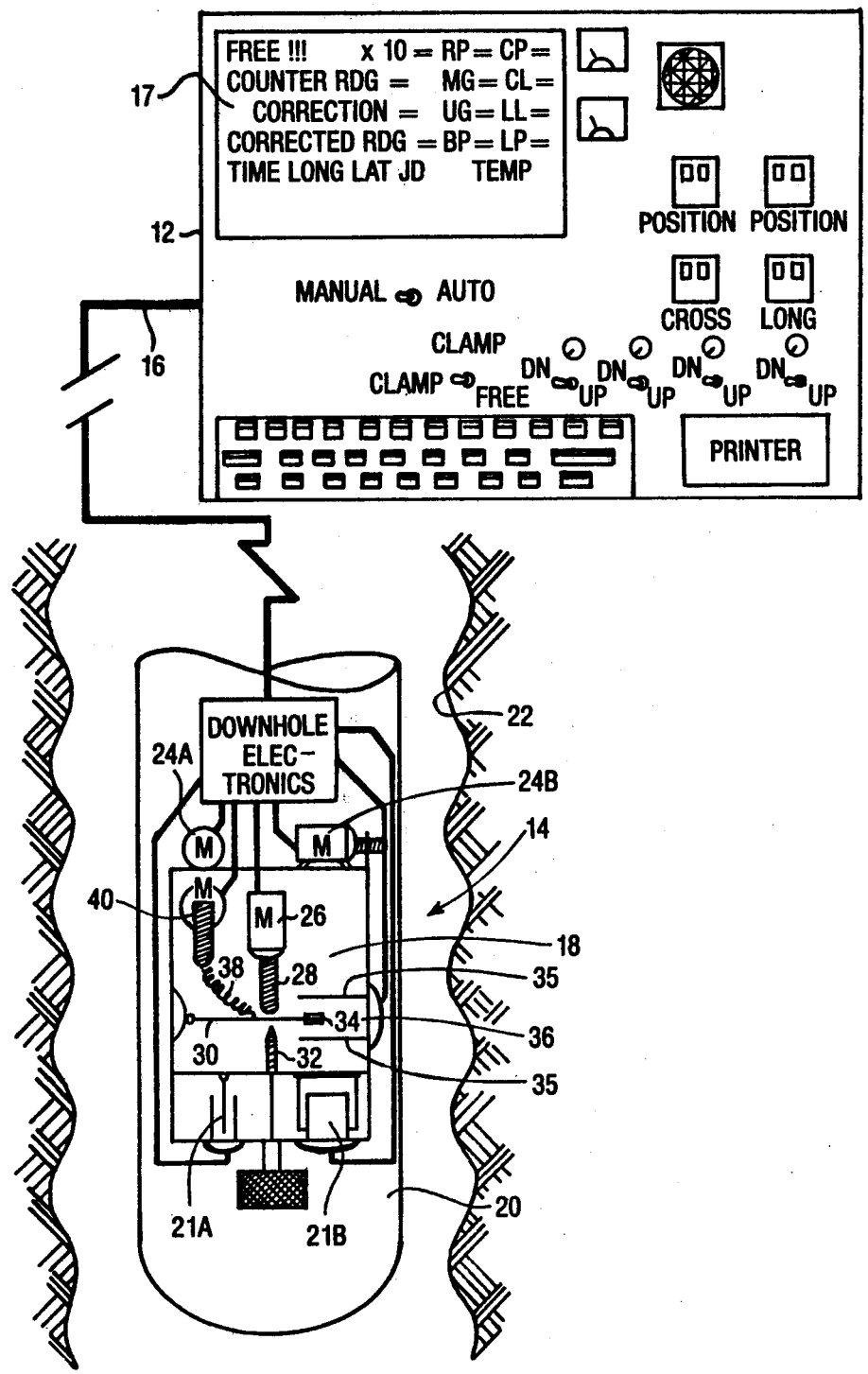
FIG. 3 is a semi-diagrammatic representation of a borehole gravity meter system of the present invention.

Now that the sequence of operation has been briefly discussed, a more detailed description of the apparatus will be provided below with a description of the software and their functions following thereafter. As shown in FIGS. 2 and 3, a borehole gravity meter system 10 of the present invention generally includes a surface control and display unit 12 and a downhole gravity meter 14 operatively connected via a wireline 16. The surface control and display unit 12 includes system initiation switches and an output device 17 for visual display of information concerning the operation of the overall system 10. The output device 17 can be a cathode-ray tube (CRT), a plasma discharge screen or the like. A keyboard is provided for inputting data into the system 10 and for certain command functions. Internally, the surface control and display unit 12 includes two microprocessors, one for system control of data and downhole motor command telemetry and the second for additional data calculations and control of the output device 17. The microprocessors used in one embodiment of the present system are Rockwell 6502 microprocessors, which contain the software programming for the operation of the system 10. The surface control and display unit 12 can also be provided with additional internal or peripheral equipment such as a tape memory and a hardcopy printer (both not shown).

The downhole gravity meter 14 includes, in one embodiment, a LaCoste and Romberg gravity meter unit 18 including leveling devices and downhole electronic circuitry for sending data to the surface through the wireline 16. The gravity meter unit 18 is protected by encapsulation within a steel tubing or sonde 20 which is lowered into a borehole 22.

The operator of the present system has the option of either operating the system 10 manually or in an automatic control mode, the latter will be described herein below. After the operator initiates the automatic control mode by operation of a switch on the surface control and display unit 12, the leveling system of the gravity meter unit 18 is activated. The gravity meter unit 18 is leveled by use of two CPI circuits, generally designated as 21A and B, attached to the underside of the gravity meter unit 18 at 90° angles to each other for the long and cross leveling of the gravity meter unit 18. Each CPI circuit includes a pendulum-like device spaced or hung between two parallel and vertical plates. A voltage is applied to the plates and the relative capacitance of the plates is converted to a voltage proportional to the position of the pendulum between the plates. The position of the gravity meter unit 18 is detected by the CPI circuits 21A and B and sent to the command microprocessor within the surface control and display unit 12, which calculates and initiates the required leveling corrections needed to level the gravity meter unit 18. These correction commands are sent to three leveling motors, one for azimuth orientation in the wellbore (not shown) and motors 24A and B which adjust the level of the gravity meter unit 18. The CPI circuits 21A and B operate continuously.

Once the gravity meter unit 18 has been brought to a level position, an unclamping sequence to unclamp or free the gravity sensing device within the gravity meter unit 18 is automatically initiated. By this sequence, a motor 26 retracts a screw 28 which is used to force a hinged beam 30 against a stationary post 32. The hinged beam 30 has a mass 34 connected to one end thereof with the opposite end hinged to a vertical support or wall within the gravity meter unit 18. The mass 34 is allowed to swing between two horizontal parallel plates 35 which form part of another CPI circuit 36, similar to the leveling CPI circuits 21A and B described above. An adjustable tension spring 38, attached at one end to the beam 30 and at another end to a measuring screw and motor system 40, is provided to apply upward force to the beam 30.

An AC voltage is applied to each of the plates 35 with the voltage 180° out of phase on each plate. The position of the mass 34 between the plates 35 causes a change in the induced voltage on the beam 30 which when phase detected by the CPI circuit 36 is sent to the surface control and display unit 12. The change in the voltage is proportional to the relative position of the mass 34 between the plates 35. This CPI output is also used to control a DC voltage applied to the plates 35 tending to electrostatically force the mass 34 to the null position which is about halfway between the plates 35. The electrostatic forces generated by the DC charge on the plates 35 tends to force the mass 34 to a position about half-way between the plates 35, which is the null position. The command microprocessor causes a signal to be sent to the measuring screw and motor system 40 to increase or decrease the tension of the spring 38 to bring the mass 34 to a predetermined position, such as a null position, which can be within ±3 milligals of the absolute balanced or nulled position. It should be noted that this circuit is always in operation, even when the beam 30 is clamped.

The use of CPI circuits to sense the position of the beam and to apply forces to the mass is known and described in:

"Linearization and Calibration of Electrostatically Feedback Gravity Meters," Moore and Farrell, Journal of Geophysical Research, vol. 75, no. 5, Feb. 10, 1979.

"Operation of LaCoste and Romberg Gravimeter at Sensitivity Approaching the Thermal Fluctuation Limits," Weber and Larson, Journal of Geophysical Research, vol. 71, no. 24, Dec. 15, 1966.

"Measurements in the Earth Mode Frequency Range by an Electrostatic Sensing and Feedback Gravimeter," Block and Moore, Journal of Geophysical Research, vol. 71, no. 18, Sept. 15, 1966.

All of these articles are incorporated herein by reference.

Once the mass 34 has been brought to approximately a null position, the command microprocessor automatically causes all operations of the gravity meter unit 18 to momentarily stop and wait for a certain length of time, such as about 7 seconds, to allow the gravity meter unit 18 to totally stabilize. Thereafter, the command microprocessor reads the relative position of the mass 34 between the plates 35 of the CPI circuit 36 and internally calculates or predicts the rotation(s) needed of the measuring screw and motor system 40 to move the mass 34 to a "window" about the null position, usually within 0.1 milligals, and then activates the measuring screw and motor system 40 for the exact duration needed to adjust the mass 34 to this null position. The command microprocessor can predict exactly how much to rotate the measuring screw and motor system 40 because within its programmed software is a scale factor which relates a rotation of the measuring screw exactly to a DC voltage change across the plates 35 and vice versa. By way of further explanation, the AC signals sent across the plates 35 are 180° out of phase each to the other, and if the voltage signals were summed the resulting value would be zero. However, if the mass 34 is not perfectly located between the plates 35, a voltage differential is caused when the AC signal is phase detected. For example, if the phase detected voltage differential signal indicates the mass is out of position towards the top plate then the amount of this differential signal indicates exactly how far the mass is towards the top plate. The command microprocessor reads the differential signal and then directly calculates the needed rotation (and direction of rotation) of the measuring screw and motor system 40 to bring the mass 34 to a null position.

Once the mass 34 has been nulled, the command microprocessor reads the relative position of the measuring screw to obtain the representation of the gravity. The measuring screw position is "read" by counting the number of full and partial rotations of a potentiometer (not shown) operatively connected to the measuring screw. In one embodiment, each rotation of the potentiometer is equal to exactly 100 microgals or 0.1 milligals. The number of rotations of the potentiometer from a certain zero position indicates a value which is equivalent to the uncorrected gravity representation at that point within the formation. This gravity representation is then sent to the surface control and display unit 12.

This uncorrected gravity representation can then be corrected for the "scale factor." The scale factor is caused because each gravity meter is not the same and a 360° rotation of the potentiometer often is not equal to exactly 100 microgals. Therefore, each gravity meter unit 18 has its own correction or scale factor which can be inputted into the command microprocessor at the set up of the gravity meter unit 18. The display microprocessor calculates the corrected representation of gravity for the scale factor which is then outputted to the surface control and display unit 12.

Other important information can be calculated by the borehole gravity meter system 10, such as gravity measurements corrected for the tides. Before the system 10 is initiated, the longitude and latitude of the wellbore 22 is inputted through the keyboard into the surface control and display unit 12 and display microprocessor calculate the correct representation of the gravity adjusted for the tide effects at that location and that time of the day.

The average or bulk density of the formation can also be taken by taking a first gravity measurement, as described above and taking a second gravity measurement within the wellbore at a different location. Upon appropriate initiation, the display microprocessor can calculate the average or bulk density of the formation from these two readings.

Further, the system 10 can calculate the porosity of the formation. The matrix density of the formation, such as for sandstone, is inputted into the display microprocessor, along with the fluid density of the formation fluids. From previous bulk density calculations, the command central processor can calculate the porosity of the formation.

After all the calculations have been completed, the operator initiates post clamp sequence which runs the clamping motor 28 to clamp the beam 30 and the borehole gravity meter 18 is then moved to another location in the borehole 12 or removed.

The software control of the borehole gravity meter system through the command microprocessor and display microprocessor is achieved by microprocessors referred to as CP's, such Rockwell 6500/1EB-1 microprocessors. Additional electronic equipment is used in conjunction with the CP's to telemetry the data from the downhole gravity meter unit 18 and to effect control of the whole system 10. The CP's software programming determines the manner in which the data telemetry is interpreted and which and what control is executed. The downhole telemetry data starts as DC analog signal which are transformed to digital pulses for transmission through the wireline 16. The pulses number from 0 to 98 (at 20 mv/pulse), and are generated at about a 10 KHz rate. There are about 16 analog signals and each is converted and sent to the surface control and display unit 12 as a short 10 KHz burst of information. The burst represents the digital value of the analog signal and is called a "word" and a set of 16 words is termed a "frame" of data. The timing in sending the words uphole is based on a 60 Hz power frequency, which is used as the system clock. Therefore, the words are sent uphole at the rate of about one word every 1/60 of a second. A special word, entitled SYNC, differs from all of the other words used by being capable of generating 120 pulses as opposed to a maximum of 98 pulses for the other words. This capability is used to indicate the end or start of a frame. The CP uses the system's clock to determine the end or start of a word and the SYNC word to determine the end or start of a frame.

When the data is transmitted uphole through the wireline 16, it can be distorted and can be conditioned into a digital signal level by circuitry within the surface command and display unit 12. The digital signal is fed to the CP input, labeled CNTR and the system clock pulses are fed into the CP input labeled NMI. The CNTR input is set to a mode called an "event counter mode," which allows the CP to count pulses as they are received, without disturbing other program executions. When a system clock pulse is detected at the NMI input, an interrupt of the program execution is caused, which forces the CP to execute a short program sequence (called the NMI routine) before continuing the main program execution. The NMI routine calculates the number of pulses in the word, resets the event counter in preparation for the next word and then stores the results in one of 16 memory locations allocated for the words. These 16 memory locations are termed the "data string" locations and are stored in the order that they were received. Before a word is stored, it is checked for having greater than 110 pulses, which would indicate the SYNC word, and if a SYNC word is recognized, the CP resets a memory pointer (termed the "word counter") that points to the correct memory location in the data string for the words. If the word is not the SYNC word, it is stored in memory pointed to by the word counter, which is then prepared for the next word.

The NMI routine not only keeps the "data string" current, but it also serves the function of integrating the scale value (UG) as described above, and gives an averaging effect of the UG value to provide some noise immunity. The integrated value is then used by the command software program in place of the UG instantaneous value and in this way the CP will not take action on abrupt changes in the position of the mass 34. The NMI routine also serves as a timing device for the program by incrementing or decrementing memory locations after each word (1/60 of a second) or after each SYNC word (16/60 of a second), thus delays can be set in increments of 1/60 or 16/60 of a second, if desired.

The leveling and nulling operations of the borehole gravity meter system 10 is implemented by comparing a data string value against a set parameter within the program, then taking action, such as operating downhole motors, until the data string value is within the program parameters. Activating a downhole motor to level or null the meter from uphole is accomplished in two steps, first an audio frequency tone is sent downhole to select and activate the appropriate motor power relay. Second, a positive or negative DC voltage level is sent downhole to set the direction and speed of the motor to be run. Uphole, a plus or minus DC voltage is connected to a direction relay, whose output supplies one or the other polarity to the input of the motor speed relays. The output of a motor speed relay is connected to a potentiometer that can be set for a desired voltage level, which is sent downhole and controls the output of the downhole current amplifier that supplies power to the motor power relays, which are selectively activated by the transmitted tone to supply electrical power to the particular motor.

The CP controls the downhole electronics through the CP's I/O (Input/Output) ports. By loading the I/O with the correct code, the CP can activate the tone generator and relays and send a code to certain ports to cause the correct tone to be generated followed by other ports being loaded with a code to activate the direction and motor speed relay. Thereafter, these signals are combined and sent downhole to activate the particular motor. The motors used in the gravity meter unit 18 can be activated by the following four routines, named the SCAN, POSTCLAMP, LEVEL and AUTOREAD. The following is a description of each.

Figure 4:
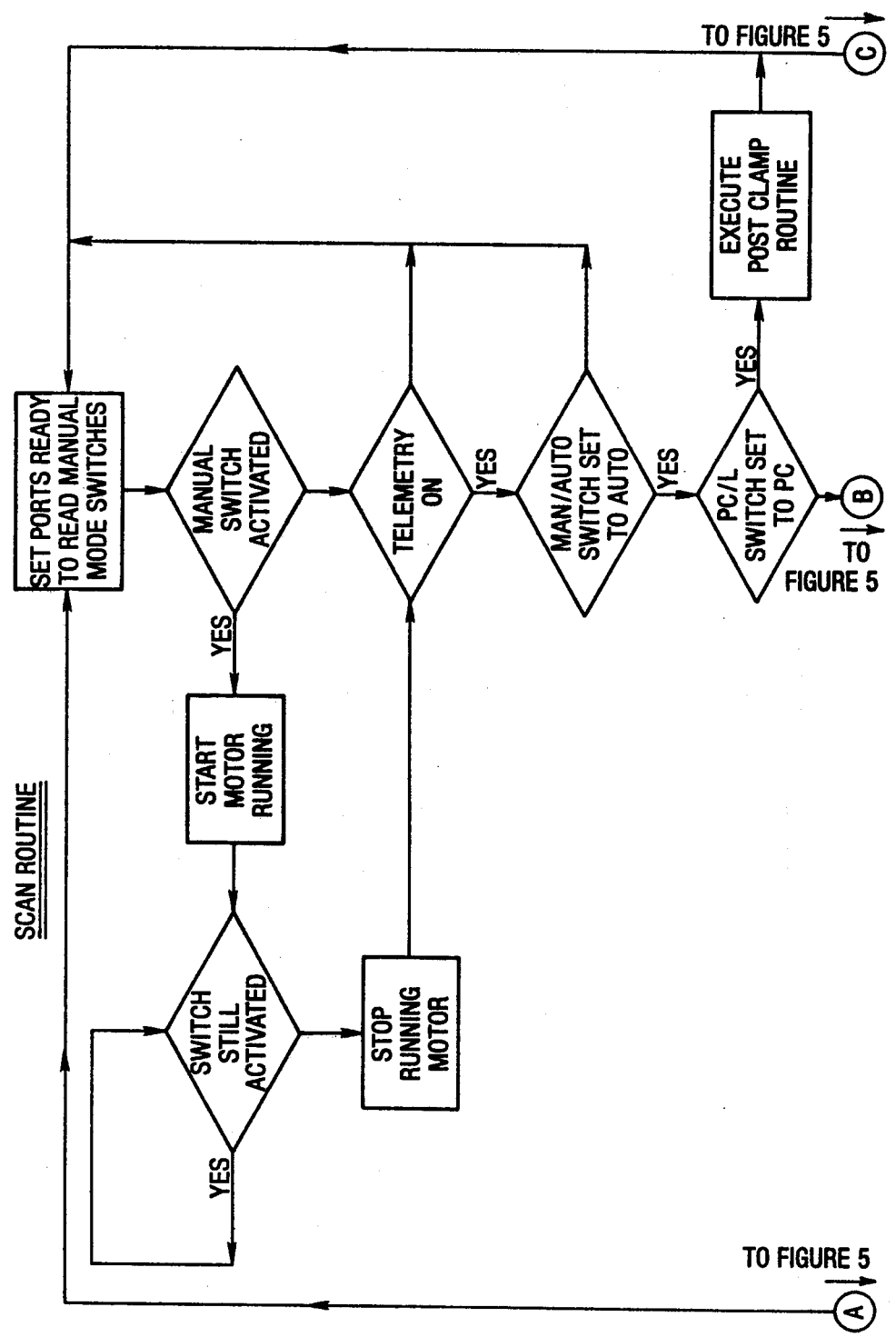
FIGS. 4 and 5 are the flow diagram of the SCAN routine.
Figure 5:
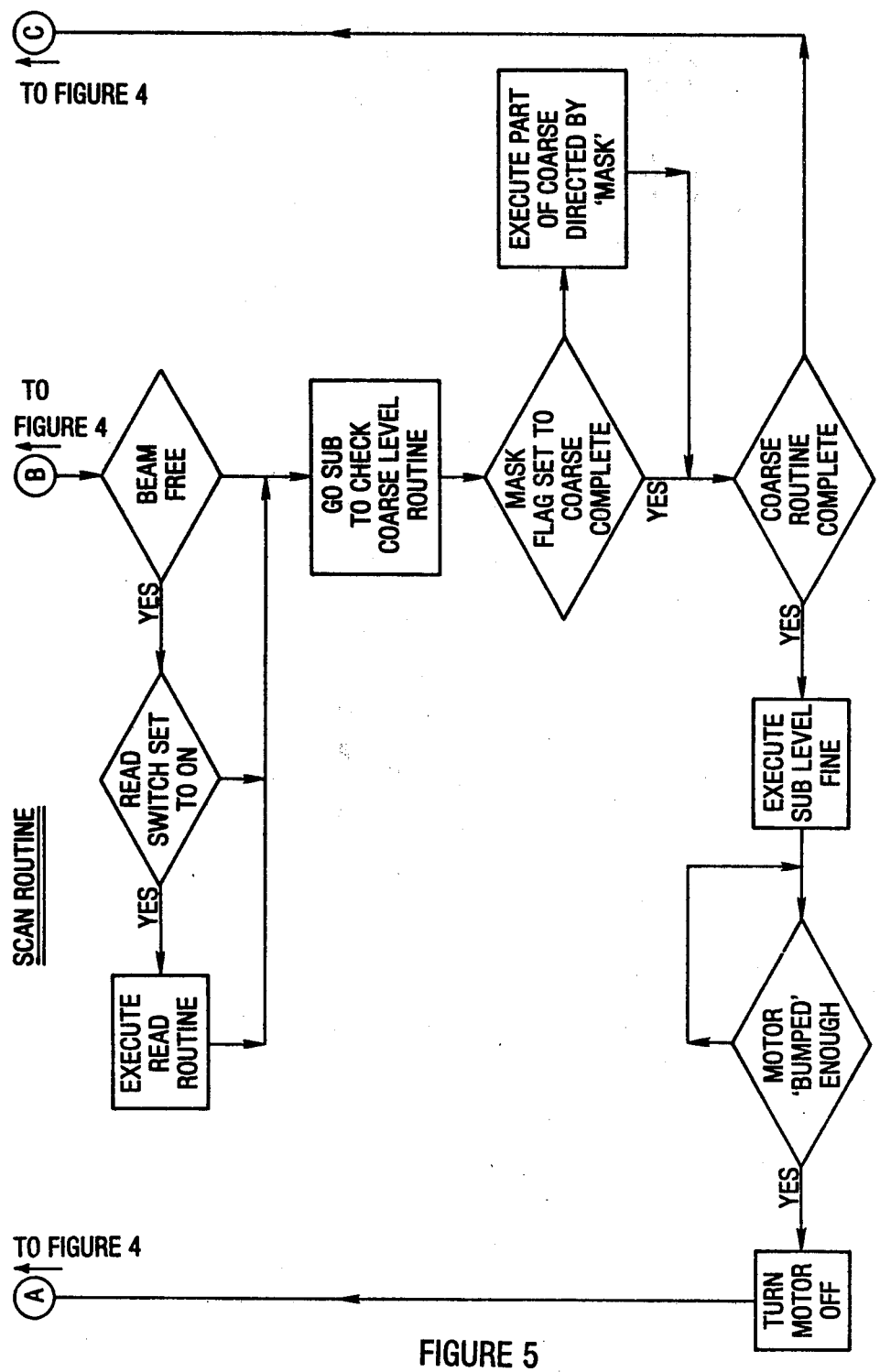

The SCAN routine, as illustrated in FIGS. 4 and 5, receives its name from the fact that it scans or checks the position of the control switches located on the surface control and display unit 12. When a switch is activated by the operator, the CP is directed to the appropriate motor run subroutine, starts the motor running and returns to checking whether the switch is still activated. When a manual motor run switch is activated, the program executes, but once the switch is released, a motor off subroutine is executed and the scanning is continued. If there are no motor run switches activated, SCAN checks the mode of the Manual/Auto switch (used to set the system 10 into automatic operation); if the manual mode is selected, the program returns to checking the motor switches.

It should be noted that if the data telemetry is not operative, the program will execute as if in the Manual mode. However, if the Auto mode is selected, the program proceeds to check the status of a postclamp/level switch. Depending on the mode selected, the program will be directed to execute one of the two routines: POSTCLAMP or LEVEL. It should be noted all program sections start from SCAN, perform the program execution necessary and return back to the SCAN routine.

Figure 6:
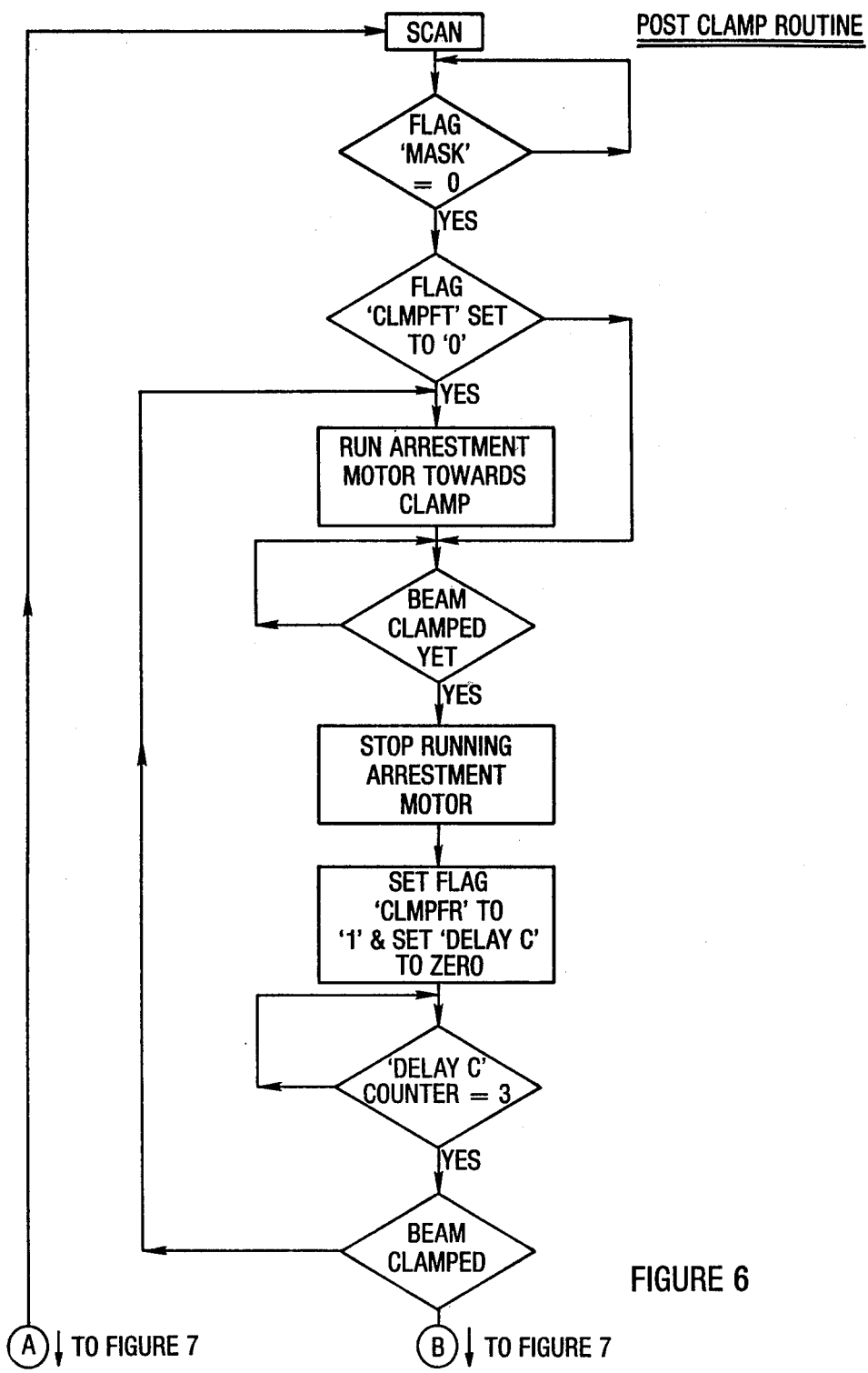
FIGS. 6 and 7 are the flow diagram of the POST-CLAMP routine.
Figure 7:
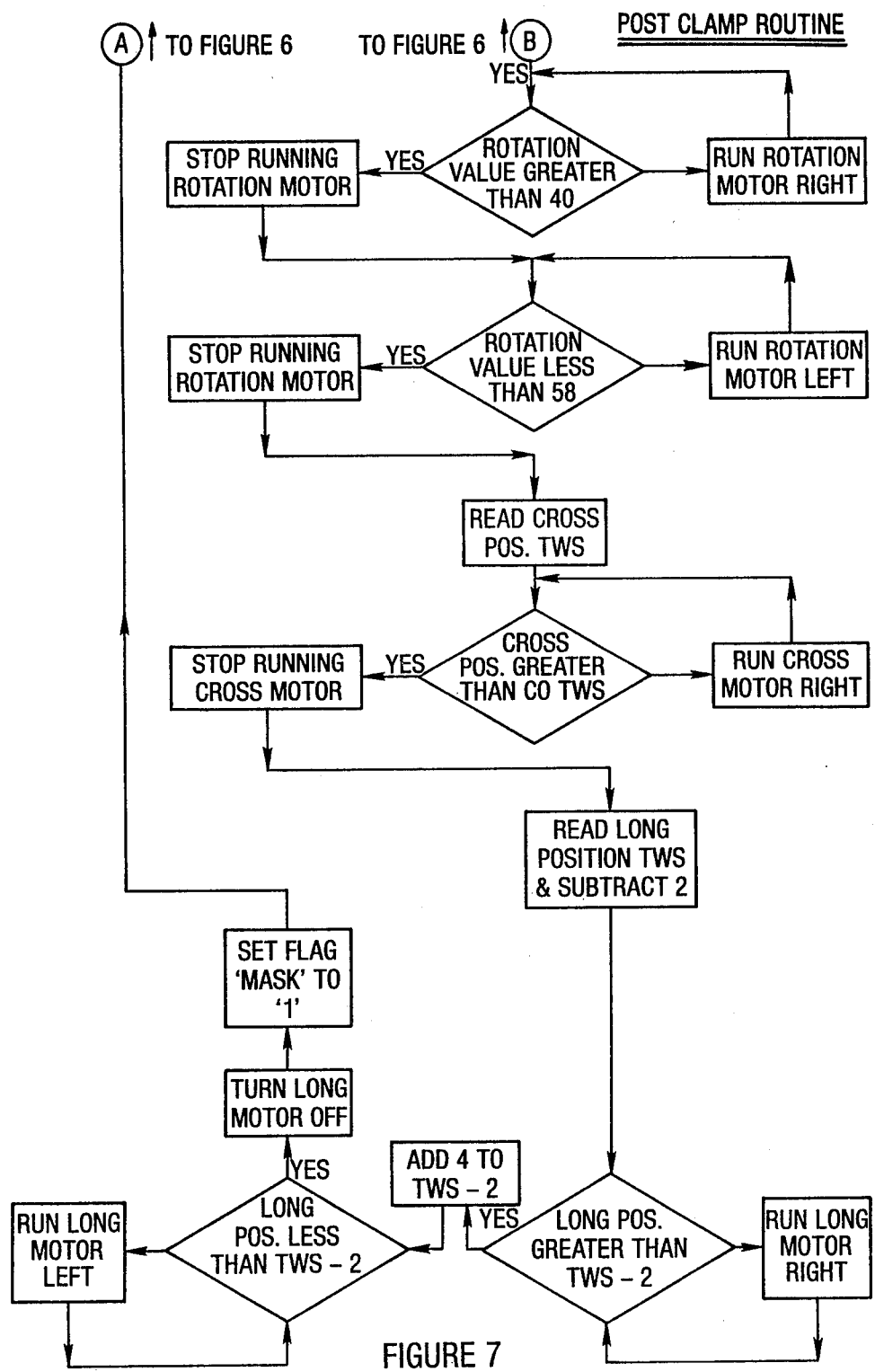

The POSTCLAMP routine, as illustrated in FIGS. 6 and 7, is executed when a mode switch is set to POSTCLAMP. An internal code flag is set to zero with flags being memory locations containing a value that can be used to effect program execution on an "if then or if not" condition. For example, if a flag equals zero, then execute this program sequence; if not, then execute another program sequence. In the postclamp routine case, if, for example, the flag, named Mask, is zero, then execute the POSTCLAMP routine, otherwise return to the SCAN routine.

The Mask flag is set to zero by either depressing a reset switch on the surface control and display unit 12 or at the end of the program sequence for the Coarse Level routine, described later. Assuming Postclamp is requested and the Mask flag is zero, the following program sequence is executed; the beam 30 is checked for being in the clamped state and if not the clamping motor 28 is activated. When the clamping sequence is complete, the CP will set an additional flag to indicate that the beam 30 is clamped. This is followed by a short wait time and again the beam 30 is rechecked for being clamped. This is used as a safety feature in case the clamping sequence had not been finished.

The next step is to run an orientation motor which is used during the leveling sequence to rotate the gravity meter unit 18 around a vertical axis until its position is oriented towards the azimuth of least borehole inclination, until the orientation is centered within its range. The cross level motor 24A is then run until its position indicates a value greater than a Cross Position TWS setting (set by the operator on the surface control and display unit 12). Next the long level motor 24B is run until its position indicates a certain value within some number of the Long Position TWS setting. The TWS position settings are the optimum starting position for the next level sequence. It should be noted that if the values meet the TWS settings, then no action is necessary. The final action of the Postclamp routine is to set the Mask flag to "one," which will be used by the Level routine at the start of its execution, and then program execution returns to SCAN.

Figure 8:
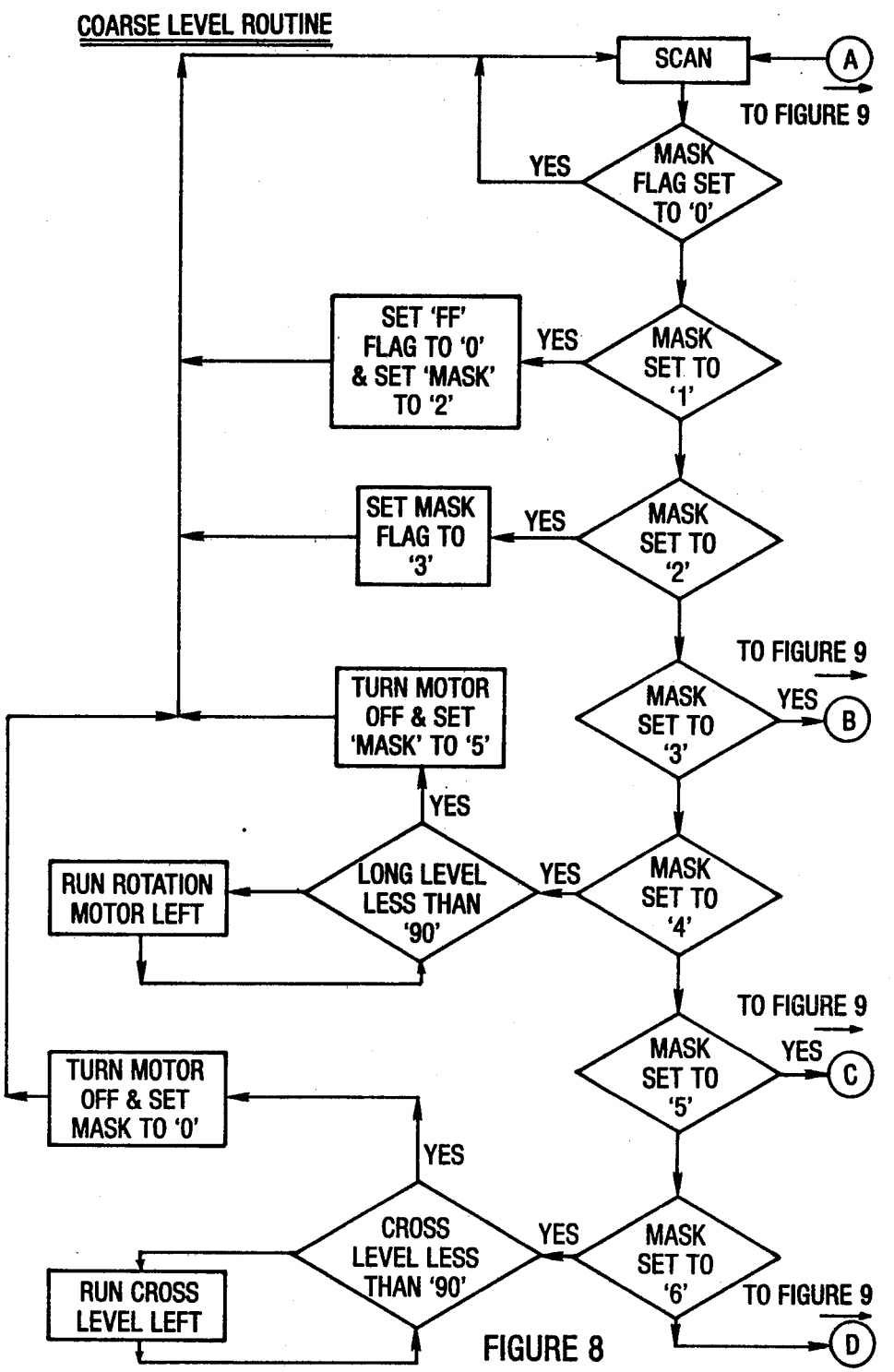
FIGS. 8 and 9 are the flow diagram of the COARSE LEVEL routine.
Figure 9:
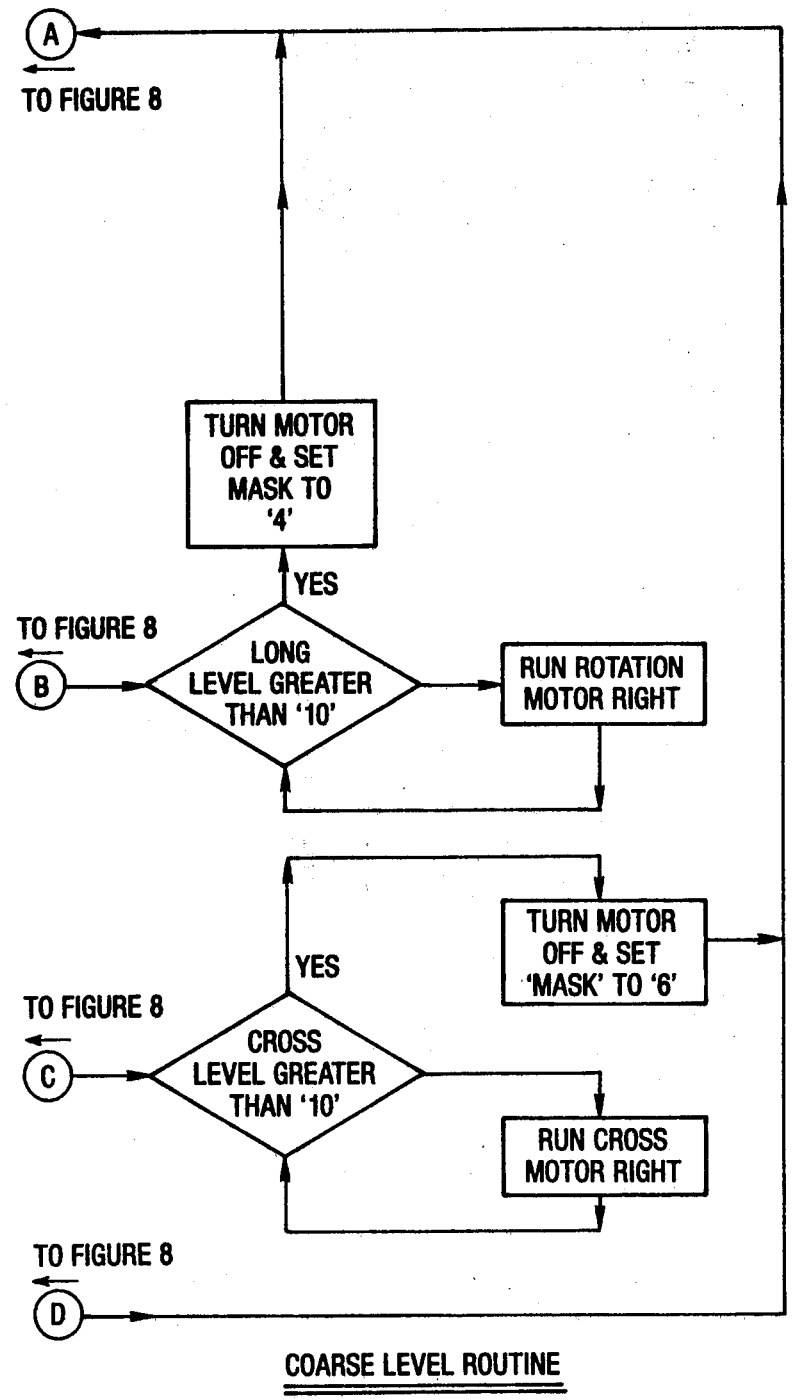
Figure 10:
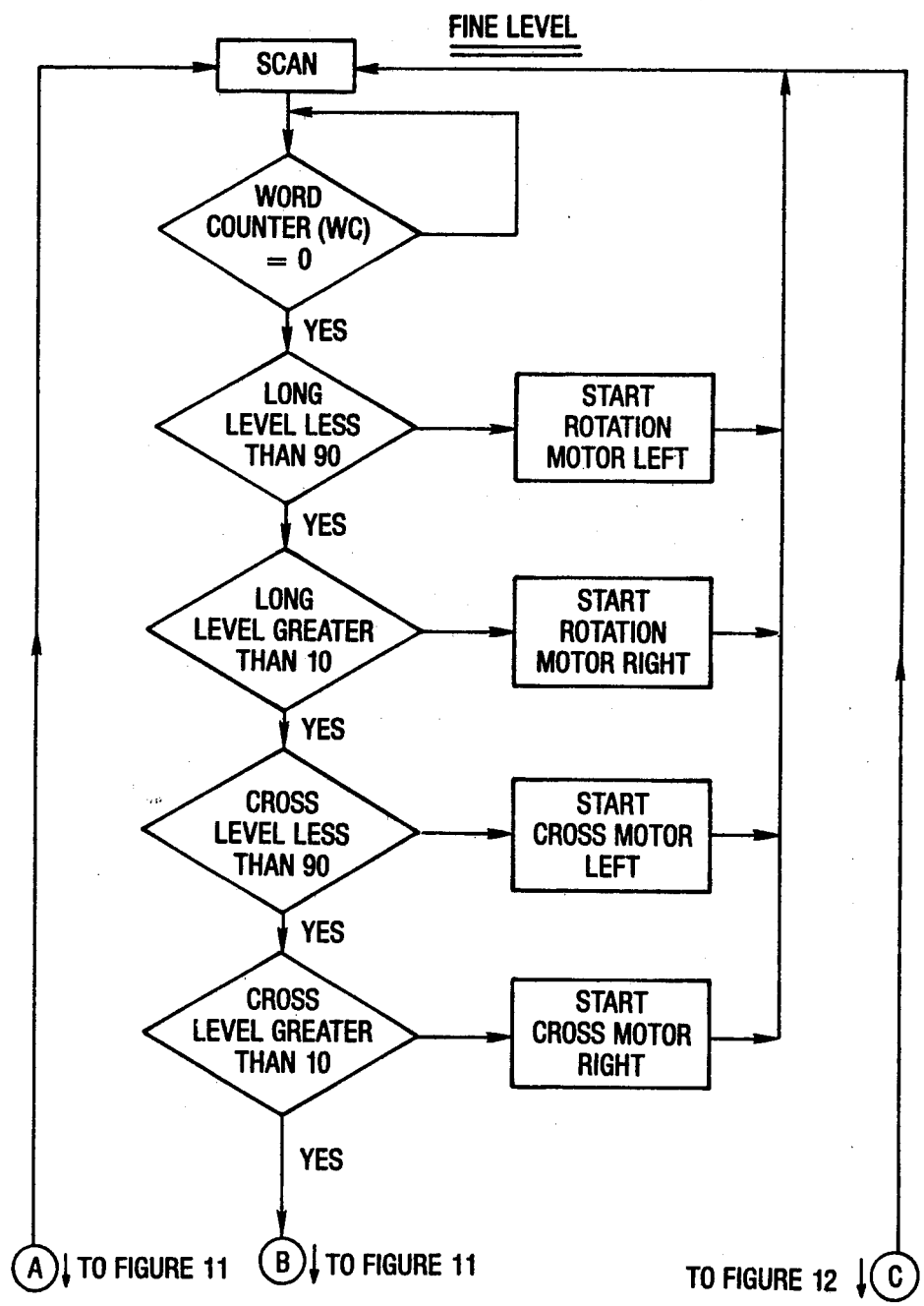
FIGS. 10, 11 and 12 are the flow diagram of the FINE LEVEL routine.
Figure 11:
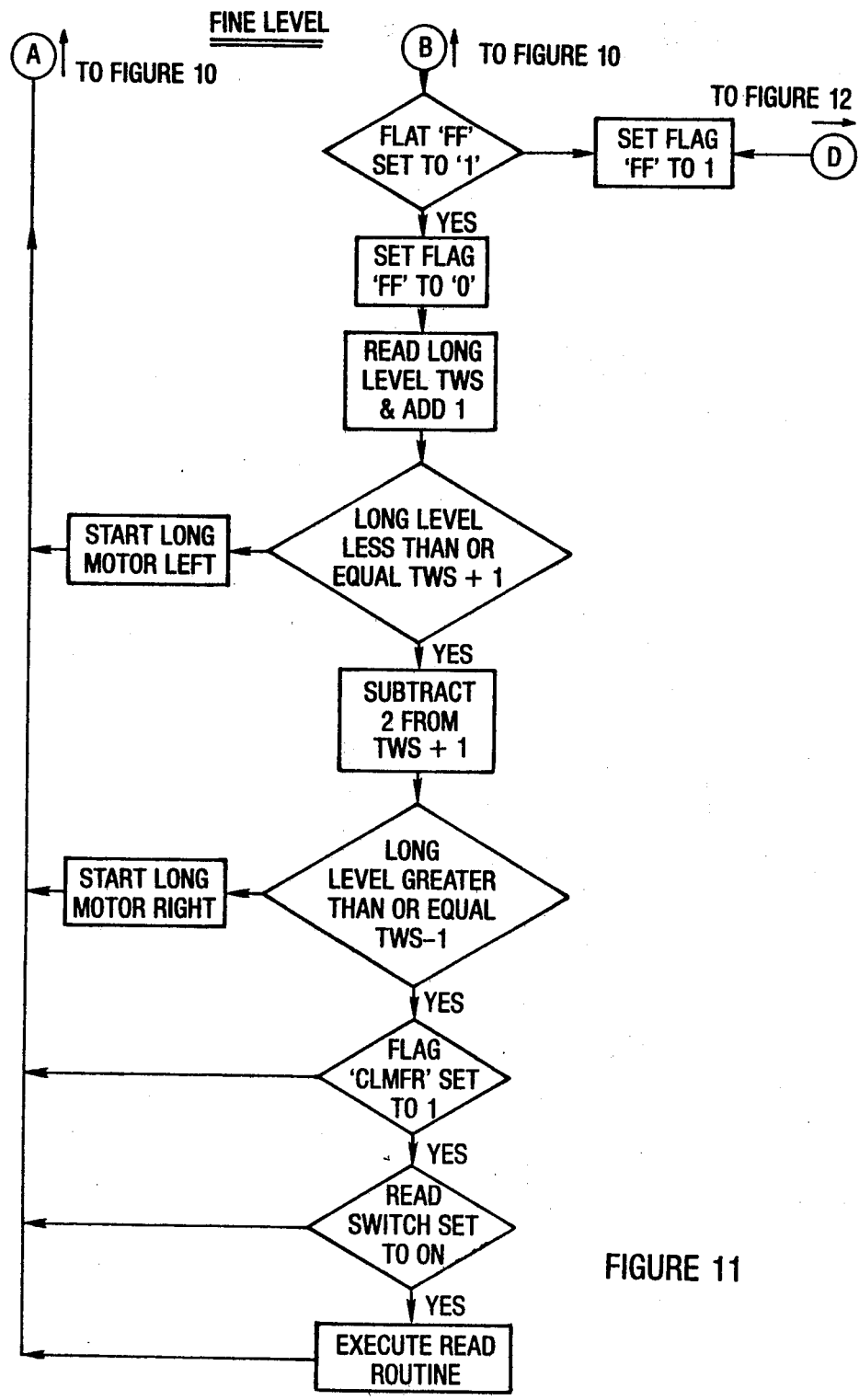
Figure 12:
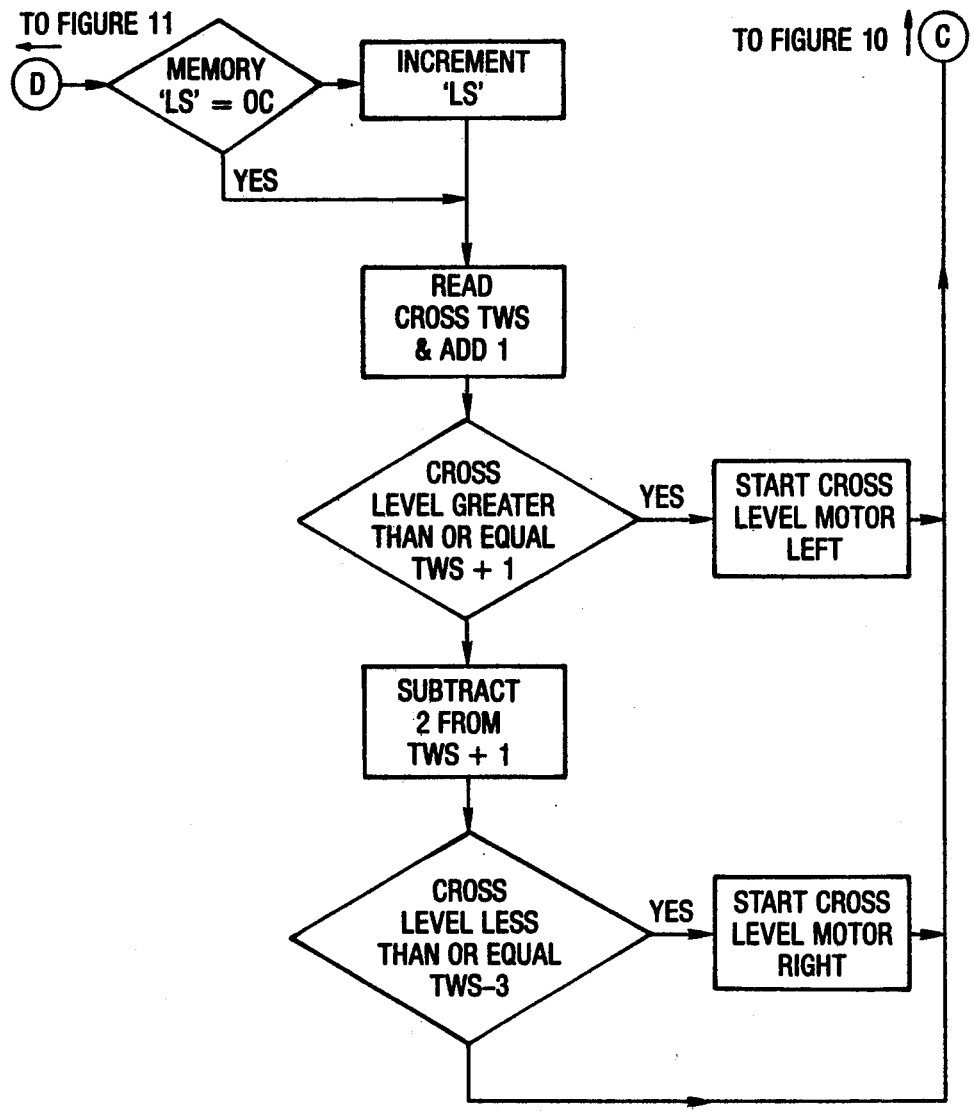

The level routine is divided into two sections: COARSE, shown in FIGS. 8 and 9, and FINE, shown in FIGS. 10–12. As the names indicate, the Coarse routine is a rough adjustment in the level positions to bring the gravity meter unit 18 into approximately its level position. The Coarse routine starts from the SCAN routine, where the Postclamp/Level mode switch is checked for the selection of the Level mode. If the Level mode is selected, the flag (MASK) is checked to find if it indicates the completion of the Coarse routine. If the flag indicates the routine is not complete, the section of the Coarse routine indicated by the flag is executed, the flag is reset and program execution returns to SCAN. This sequence is repeated until the flag indicates that the course level is completed. It should be noted that the Coarse routine is executed only one time after the selection of the Level mode and can only be entered into again by resetting the flag, which happens during the Postclamp routine.

The Fine level routine starts in the SCAN in the same manner as the Coarse section, but Fine is executed as the default of the setting of the Coarse completion flag. Another flag (labeled FF) is used by the Fine routine to alternately "bump" the Cross and Long level motors 24A and B to achieve the correct "perfect" level. Bumping one level motor and then the other is usually necessary, as mechanical running of one level often effects the position of the other. The bumping duration is determined by incrementing and decrementing memory locations as described in the NMI routine. The starting duration of the bump time is set at the end of the Coarse level routine and each time the Fine level routine is executed the bump time is decreased, until a defined time limit is reached. The end result of the Fine routine is to maintain the levels to within one of their TWS level settings on the surface control and display unit 12.

Figure 13:
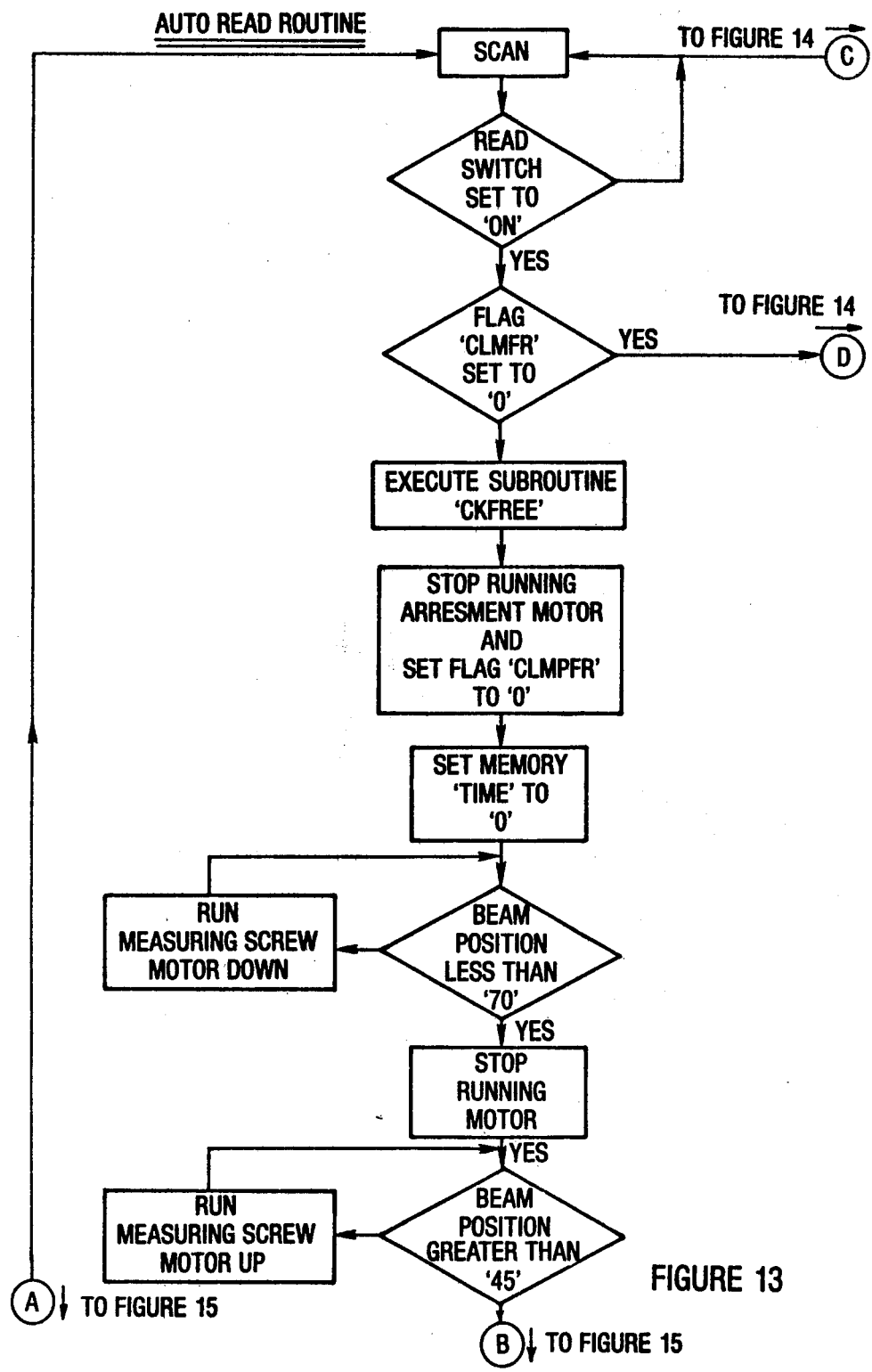
FIGS. 13, 14 and 15 are the flow diagram of the AUTOREAD routine.
Figure 14:
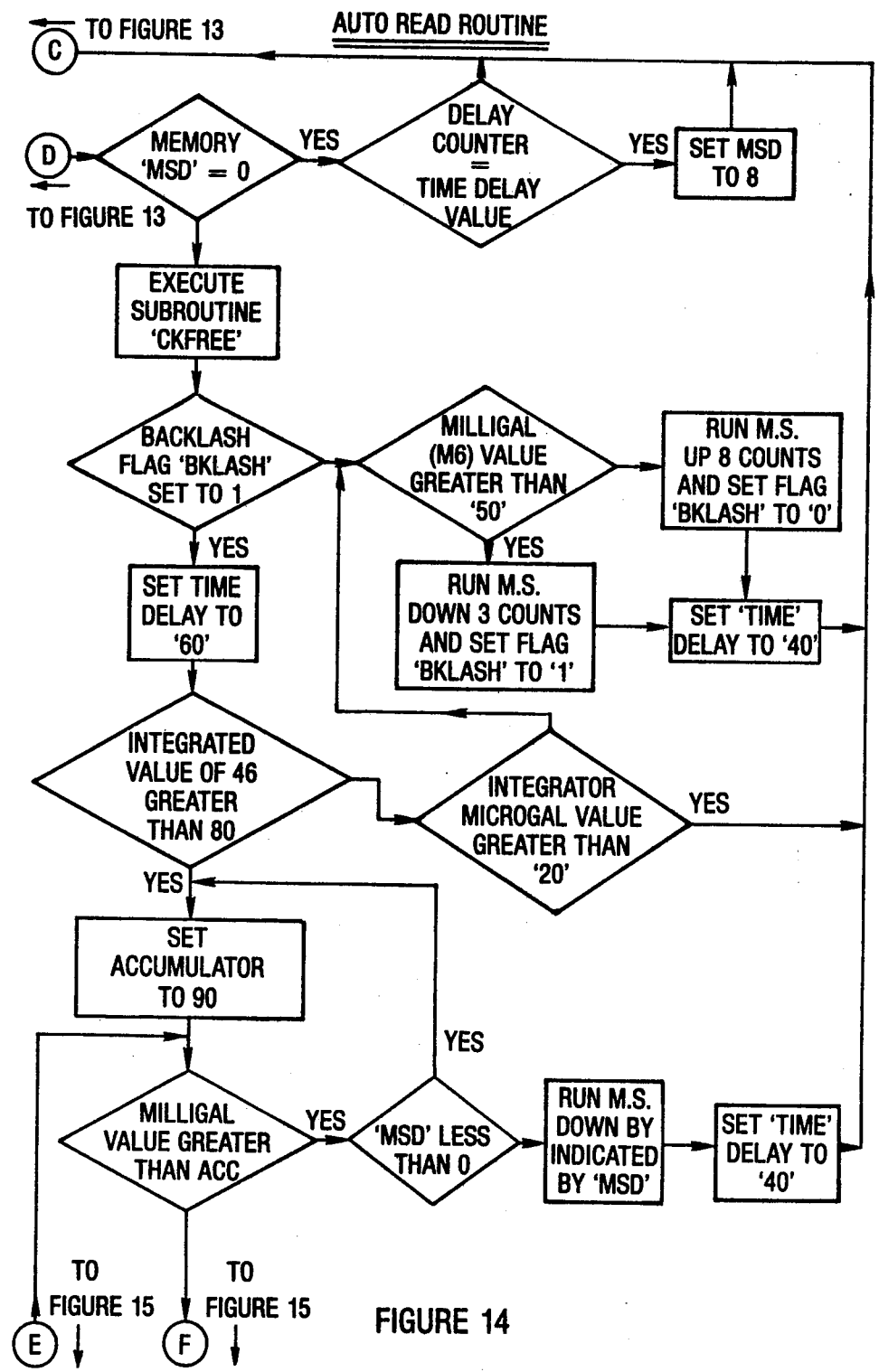
Figure 15:
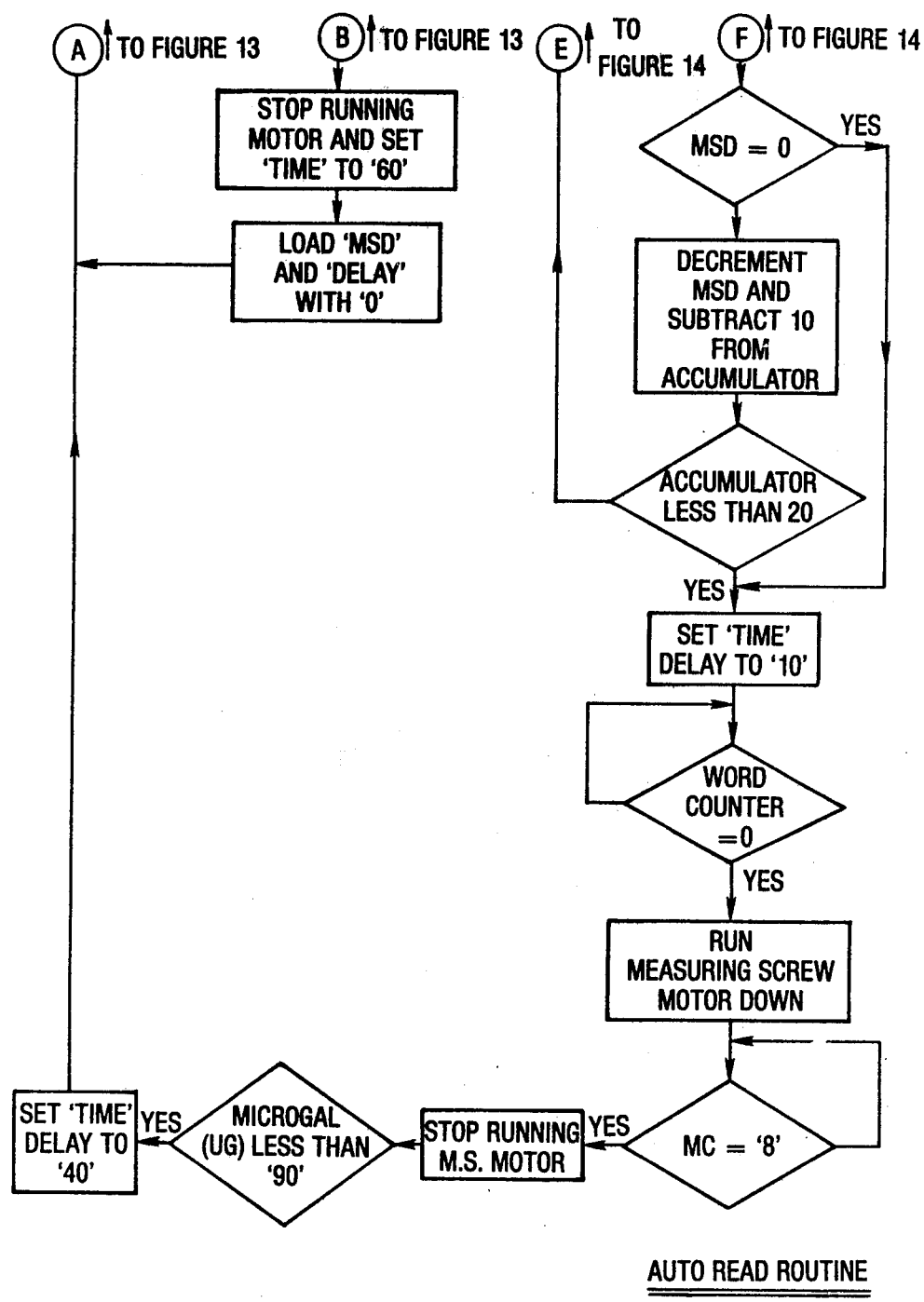

The AUTOREAD routine, as illustrated in FIGS. 13–15, will start after the gravity meter unit 18 is leveled. As noted above, the CPI circuit 36 signal is analog in format. When the mass 34 is unclamped, the beam position is checked to determine whether it is in a "window" or central position where the electrostatic forces of the CPI circuit 36 can be used to move the mass 34 to a predetermined null position. This position is some value plus or minus from the absolute or "perfect" null position. If the mass 34 is not in this window then the measuring screw and motor system 40 is run in the correct direction until the mass 34 is within this window. The differential DC voltage applied to the CPI plates is linear with respect to the resulting electrostatic force on the mass 34 and from this linear relationship and the differential voltage scale factor the AUTOREAD routine calculates the exact spring tension adjustment required via rotations of the measuring screw to move the mass 34 to the null position, and the measuring screw and motor system 40 is run in the correct direction and duration to null the mass 34 to usually within about ±0.1 milligal.

Due to some mechanical backlash within the measuring screw and motor system 40, the actual gravity readings are taken only when the measuring screw is run in one direction only. If the measuring screw is caused to run too far, because of noise, and a null is not achieved, the measuring screw is run beyond the reading in the direction from which the readings are always made, and then run back to obtain a null.

The Calculation and Display Processor (DP) within the surface and control unit 12 provides the operator with the status of the gravity meter unit 18 and the results of assorted calculations. The DP converts the processor code into another readable code, such as ASCII and then sends the code to the display 17.

Displaying information to the operator using only BASIC code is too slow to provide an adequate update of the meter status; therefore, machine language code is used to display the meter status values. The meter status values are broken up into two groups. When the interrupt routine receives the SYNC words, a machine coded program will retrieve the meter status from the data string and separate the Most Significant Digit (MSD) from the Least Significant Digit (LSD). The MSD and LSD are then sent to the display. Since a SYNC word occurs at 16/60 of a second intervals and the groups are displayed alternately, each group is updated about every one-half second.

The display of numerals is controlled by the machine language coded program. When the BASIC program calls for a character to be displayed, it will put the ASCII character and the position pointers into memory locations that the machine language program can retrieve The machine language program will get the character from memory and display the character at the end of each word, excluding the SYNC word. Thus, characters can be displayed at the rate of 60 characters per second, since a word occurs every 1/60th of a second. A form of a "handshake" mode is used between BASIC and machine programs to signify that one or the other is or is not ready for another character. It should be noted that there are three ways that characters are displayed, by (i) BASIC, (ii) machine and (iii) a combination of BASIC and machine language coded programs.

Calculations performed by the DP fall into two categories, manipulating values to provide a display value and data calculations. Manipulated values range from converting HEX values to decimal to rearranging information such as that retrieved from the real time clock. This type of calculation occurs within the DP and will not be seen by the operator; however, data calculations require the operator to input values associated with the calculations to be done.

The inventors hereof know of no automated borehole gravity meter system which utilizes a CPI circuit to sense the position of the mass 34, move the mass 34 and then predicts through internal calculations the required movement of the measuring screw system, plus or minus, needed to "null" the mass. The inventors know of no automated borehole gravity meter system which automatically "nulls" the gravity meter, thereby reducing the requirements of the operator to manually adjust the beam and mass by viewing a strip chart recorder. Further, the inventors know of no automated borehole gravity meter system which internally and electronically senses and reads the measuring screw position and displays this as a numerical representation of the gravity at the surface without the need for the operator to do hand calculations. Further, the inventors know of no automated borehole gravity meter system which can calculate the scale factor of the borehole gravity meter, correct the gravity representation for the tide effects, and also provide the bulk density porosity of the formation. The features of the present invention ensure that the gravity measurements are accurate and highly reproducible with almost all detailed skill requirements of the operator having been eliminated so the quality of the gravity data is greatly improved and is not dependent on the skilled attentiveness of the operator.

Whereas the present invention has been described in particular relation to the drawings attached hereto, it should be understood that other and further modifications, apart from those shown or suggested herein, may be made within the scope and spirit of the present invention.

What we claim is:

1. A borehole gravity meter control system for operating a borehole gravity meter having gravity sensing means, means for sensing the position of the gravity sensing means and means for adjusting the position of the gravity sensing means in response to the means for sensing; the borehole gravity meter control system comprising:

electronic control circuit means, operatively connected to the means for sensing the position of the gravity sensing means and the means for adjusting the position of the gravity sensing means, for taking an indication of the position of the gravity sensing means and causing the means for adjusting the position of the gravity sensing means to apply mechanical forces to the gravity sensing means until the gravity sensing means is brought to a predetermined position; and output means for outputting a representation of said mechanical forces applied to the gravity sensing means.

2. The system of claim 1 and including means for sensing said mechanical forces applied to the gravity sensing means and electronically converting said representation of said mechanical forces to a representation of gravity.

3. A borehole gravity meter system comprising:

gravity sensing means for measuring the gravity at a location in a wellbore penetrating a formation;

position sensing means for sensing the position of said gravity sensing means;

mechanical adjustment means for mechanically adjusting the position of said gravity sensing means;

electrostatic adjustment means for electrostatically adjusting the position of said gravity sensing means;

electronic control circuit means operatively connected to said gravity sensing means and said position sensing means for taking an indication of the position of said gravity sensing means from said position sensing means and continuously causing said mechanical and electrostatic adjustment means to apply mechanical and electrostatic forces respectively to said gravity sensing means until it is brought to a predetermined position; and outputting a representation of said mechanical forces applied to said gravity sensing means.

4. The system of claim 3 and including means for electronically converting said representation of said mechanical forces to a representation of gravity.

5. The system of claim 4 and including calculation means for inputting said representation of gravity, the depth of said gravity sensing means within said wellbore, the formation matrix density and the formation fluid density and calculating and outputting the formation bulk density and/or porosity.

6. The system of claim 3 wherein said mechanical forces are applied by motor means to adjust the tension of a spring means connected to said gravity sensing means.

7. The system of claim 4 wherein said sensing means includes microprocessor means.

8. The system of claim 3 wherein said electronic control circuit means comprises microprocessor means.

9. An automated borehole gravity meter system for measuring the gravity at a selected depth within a wellbore, comprising:

gravity sensing means for measuring the gravity at the selected depth within the wellbore;

leveling means connected to said gravity sensing means for leveling said gravity sensing means;

clamping means for clamping and releasing said gravity sensing means;

adjustment means for mechanically and electrostatically positioning said gravity sensing means;

position sensing means for sensing the position of said gravity sensing means;

electronic control circuit means for continuously electronically determining the extent of activation of said adjustment means to mechanically and electrostatically adjust the position of said gravity sensing means to a predetermined position electronic calculation means for continuously electronically converting the extent of activation of said adjustment means for mechanically adjusting the position of said gravity sensing means into a representation of the gravity at the selected depth in the wellbore; and display means for displaying a representation of the gravity at the selected depth in the wellbore.

10. A method of measuring gravity with an automated borehole gravity meter system, said system including gravity sensing means, comprising:
 (a) leveling said gravity sensing means;
 (b) sensing the position of said gravity sensing means;
 (c) applying mechanical forces to said gravity sensing means in response to step (b) to bring said gravity sensing means to a predetermined position;
 (d) outputting a representation of the gravity; and
 (e) electronic control circuit means for, upon activation, automatically performing steps (b)–(d) in sequence.

11. The method of claim 10 and including sensing said mechanical forces in step (c) and electronically converting values of said mechanical forces into a representation of the gravity at the location in the wellbore.

12. The method of claim 11 and including the step of inputting said representation of gravity, depth of said gravity sensing means within the wellbore, formation matrix density and fluid density into microprocessor means for calculation and output of the formation bulk density and/or porosity.

13. The method of claim 12 and including the step of electronically calculating the average density over the depth interval between a previous selected depth, if any, and the current selected depth.

14. A method of measuring gravity in a wellbore with an automated borehole gravity meter system, comprising:
 (a) positioning a gravity sensing means at a selected depth within the wellbore, and
 (b) initiating a machine-implemented control sequence which:
  (i) levels said gravity sensing means,
  (ii) senses the position of said gravity sensing means and applies mechanical forces to said gravity sensing means to bring said gravity sensing means to a predetermined position;
  (iii) electronically converts values of said mechanical forces into a representation of the gravity at the location in the wellbore, and
  (iv) outputs said representation of the gravity.

* * * * *